United States Patent
Laurence et al.

(10) Patent No.: US 10,101,474 B2
(45) Date of Patent: Oct. 16, 2018

(54) PIXEL BASED DEAD TIME CORRECTION

(71) Applicant: KONINKLIJKE PHILIPS N.V., Eindhoven (NL)

(72) Inventors: Thomas Leroy Laurence, North Royalton, OH (US); Sharon Xiarong Wang, Highland Heights, OH (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/535,426

(22) PCT Filed: Dec. 14, 2015

(86) PCT No.: PCT/IB2015/059594
§ 371 (c)(1),
(2) Date: Jun. 13, 2017

(87) PCT Pub. No.: WO2016/097977
PCT Pub. Date: Jun. 23, 2016

(65) Prior Publication Data
US 2017/0371046 A1  Dec. 28, 2017

Related U.S. Application Data

(60) Provisional application No. 62/091,801, filed on Dec. 15, 2014.

(51) Int. Cl.
*G01T 1/24* (2006.01)
*G01T 1/17* (2006.01)
*G01T 1/29* (2006.01)

(52) U.S. Cl.
CPC .............. *G01T 1/249* (2013.01); *G01T 1/171* (2013.01); *G01T 1/2985* (2013.01)

(58) Field of Classification Search
CPC ........ G01T 1/2985; G01T 1/171; G01T 1/249
USPC ....... 250/363.03, 363.09, 252.1, 363.04, 362
See application file for complete search history.

(56) References Cited

U.S. PATENT DOCUMENTS 5,241,181 A  *  8/1993  Mertens ................ G01T 1/2985
                                            250/363.03
6,403,960 B1     6/2002  Wellnitz
(Continued)

OTHER PUBLICATIONS

Byars, L.G. et al., 2005, "Variance Reduction on Randoms from Delayed Coincidence Histograms for the HRRT", Nuclear Science Symposium Conference Record, vol. 5, pp. 2622-2626.*
(Continued)

*Primary Examiner* — David Porta
*Assistant Examiner* — Blake Riddick

(57) ABSTRACT

A positron emission tomography (PET) apparatus and method employs a plurality of radiation detectors (20) disposed around an imaging region (16) and configured to detect 511 keV radiation events emanating from the imaging region. A calibration phantom is disposed in the imaging region. One or more processors are configured to: acquire and store listmode data of the phantom; measure a random rate for each line of response (LOR) from the listmode data using a coincident 511 keV events detector (34) with a time offset (54); determine a singles rate for each detector pixel from the random event rate, for example via a histogram plotting singles rate for each detector pixel; compute a live time factor of each LOR; compute a dead time correction factor as the reciprocal of the live time factor; and correct images according to the dead time correction factor.

14 Claims, 7 Drawing Sheets

(56) References Cited

U.S. PATENT DOCUMENTS

| | | | | |
|---|---|---|---|---|
| 2002/0163994 A1* | 11/2002 | Jones | ................ | A61B 5/415 378/21 |
| 2006/0091314 A1* | 5/2006 | Williams | ................ | G01T 1/172 250/363.03 |
| 2009/0072154 A1* | 3/2009 | Watson | ................ | A61B 6/037 250/363.03 |
| 2009/0290680 A1* | 11/2009 | Tumer | ................ | G01T 1/247 378/62 |
| 2010/0057819 A1* | 3/2010 | Panin | ................ | G01T 1/00 708/203 |
| 2014/0191136 A1 | 7/2014 | Loeliger | | |

OTHER PUBLICATIONS

Townsend, D.W. et al., 1989, "Three Dimensional Reconstruction of PET Data from a Multi-ring Camera", IEEE Transactions on Nuclear Science, 35 (1), pp. 1056-1065.*

Peng, X. et al., 2009, "Prognastic value of 18F-FDG PET-CT metabolic index for nasopharyngeal carcinoma", Journal of Cancer Research and Clinical Oncology, 136 (20), pp. 883-889.*

Byars, et al., "Variance Reduction on Randoms from Delayed Coincidence Histograms for the HRRT", Nuclear Science, vol. 5, Oct. 23, 2005.

Townsend, et al., "Three Dimensional Reconstruction of PET Data from a Multi-Ring Camera", IEEE Transactions on Nuclear Science, vol. 36, No. 1, Feb. 1, 1989.

Xie, et al., "Prognostic value of 18F-FDG PET-CT metabolic index for nasopharyngeal carcinoma", vol. 136, No. 6, Nov. 20, 2009.

Knoll, "Radiation Detection and Measurement", vol. Third edition, Dec. 12, 2000.

Watson, "A hybrid algorithm for randoms variance reduction", 2009 IEEE Nuclear Science Symposium and Medical Imaging Conference, Oct. 24, 2009.

* cited by examiner

PIXEL BASED DEAD TIME CORRECTION

CROSS REFERENCE TO RELATED APPLICATIONS

This application is the U.S. National Phase application under 35 U.S.C. § 371 of International Application No. PCT/IB2015/059594, filed Dec. 14, 2015, published as WO 2016/097977 on Jun. 23, 2016, which claims the benefit of U.S. Provisional Patent Application No. 62/091,801 filed Dec. 15, 2014. These applications are hereby incorporated by reference herein.

FIELD

The following relates generally to medical imaging. It finds particular application in calibration of a positron emission tomography (PET) detectors for quantitative analysis, imaging, or other tasks, and will be described with particular reference thereto. However, it is to be understood that it also finds application in other usage scenarios and is not necessarily limited to the aforementioned application.

BACKGROUND

PET quantitative analysis techniques seek to quantitatively assess the tissue radioactivity concentration, typically scaled by the injected activity per unit mass or another normalization factor. The quantitative analysis is based upon a linear relationship of patient image intensity with uptake of the imaging agent. For a fluoride-18 (F18) radioisotope, the most common quantitative image analysis metric is Standardized Uptake Value (SUV), which is calculated either pixel-wise yielding a parametric image, or over a Region of Interest (ROI). However, the linear relationship used to transform image intensity to tissue radioactivity concentration is derived from a SUV calibration which is typically computed as a single curve for the entire system, i.e. the same SUV calibration curve is used for each detector pixel. The SUV calibration curve also incorporates pixel dead time. During clinical imaging the PET system typically operates near or in the so-called "paralyzed detector" regime, in which detector dead time is a significant factor. This dead time results because there is minimum time between gamma particle detection events—that is, if two gamma events impinge on the detector in (too) short succession, then the second event will not be detected because the detector has not yet reset after detecting the first event. Because a single system-level SUV calibration curve is used, the dead time is assumed to be the same for all pixels. In the SUV calibration curve, the dead time is seen as a sub-linearity to the singles rate-versus-radioactivity curve due to reduced observed counts at high radioactivity level caused by "missed" counts during the dead time.

SUV calibration typically employs a cylinder source which contains F18 at a high activity level. The calibration source is located at the gantry ISO center, and parallel to patient bed (i.e. cylinder axis oriented along the axial direction). PET data acquisition is performed periodically, until the source is decayed to a level below detection. The reason for placing the cylinder source at the ISO centre is to factor out the variations caused by positioning and source unevenness. As the radioactivity concentration of the calibration source is known as a function of time throughout the decay process, the result is the desired curve relating image intensity to radioactivity level. This process is known as SUV calibration.

With reference to FIG. 1, the difference between SUV calibration and patient scan is illustrated. The SUV calibration uses a uniform cylinder phantom, with detectors at locations A, B, and C getting the same amount of exposure and having the same singles count rate. However, during a patient scan, detectors at A and B receive more exposure than the detectors at C, thus their singles rates are different.

However, such detector pixel-level effects are not accounted for by the single system-level SUV calibration curve.

SUMMARY

In accordance with one aspect, a diagnostic imaging system comprises a plurality of radiation detectors and at least one processor. The plurality of radiation detectors are configured to detect coincident radiation events defining lines of response (LORs) emanating from an imaging region and detected by detector pixels of the radiation detectors. The at least one processor is configured to: cause the radiation detectors to acquire listmode data comprising singles events detected by the detector pixels; and compute a dead time correction factor for each LOR defined by a pair of detector pixels.

In accordance with another aspect, a method is disclosed for computing dead time correction factor per pixel in a positron emission tomography (PET) scanner. The method comprises: using PET radiation detectors, detecting a plurality of 511 keV radiation events emanating from an imaging region; and using an electronic data processing device, computing a dead time correction factor for each line of response (LOR) defined by a pair of detector pixels of the PET radiation detectors.

In according with another aspect, a positron emission tomography (PET) imaging system comprises PET radiation detectors disposed around an imaging region configured to detect radiation events emanating from the imaging region, a calibration phantom configured to be disposed in the imaging region, the phantom comprising a positron-emitting radioisotope, and one or more processors configured to: acquire listmode data of the phantom using the PET radiation detectors as radioactivity of the phantom decays over time; determine a radioactivity level versus singles rate curve based on the acquired listmode data and a known radioactivity decay rate of the phantom over the acquisition of the listmode data; determine from the listmode data a random event rate for each line of response (LOR) connecting two detector pixels of the PET radiation detectors; determine a singles rate for each detector pixel based on the random event rates for the LORs; compute a live time factor of each LOR between detector pixel i and detector pixel j based on the singles rates for the detector pixels i and j; and compute a dead time correction factor for each LOR as the reciprocal of the live time factor computed for the LOR.

One advantage resides in a dead time correction factor for each pixel in the system.

Another advantage resides in linking pixel singles rates to dead time correction factors.

Still further advantages of the present invention will be appreciated to those of ordinary skill in the art upon reading and understand the following detailed description

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION OF EMBODIMENTS

Calibration techniques disclosed herein overcomes the problems described above by providing a complete map of dead time corrections for each detector pixel derived from signal measurement. Advantageously, the original SUV calibration technique remains the same, but is extended by obtaining the mapping of detector elements' live time (or dead time, which contains the same information as live time). For patient scans, the disclosed techniques determine random events, which are estimated using delayed events, and the link between detector element singles rate, radioactivity, live time, and dead-time correction is established.

Figure 1:
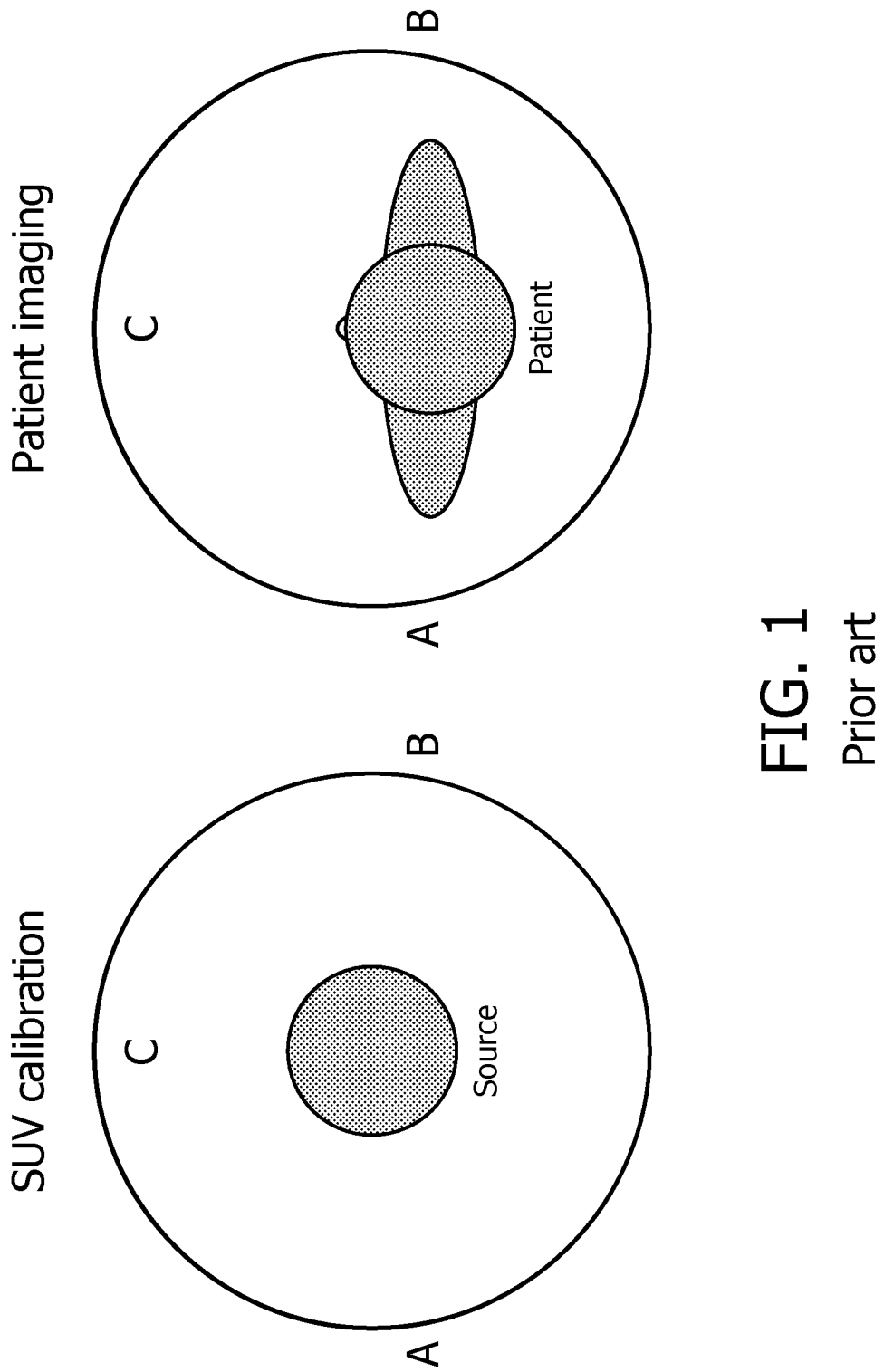
FIG. 1 depicts differences between a cylindrical phantom and a patient.
Figure 2:
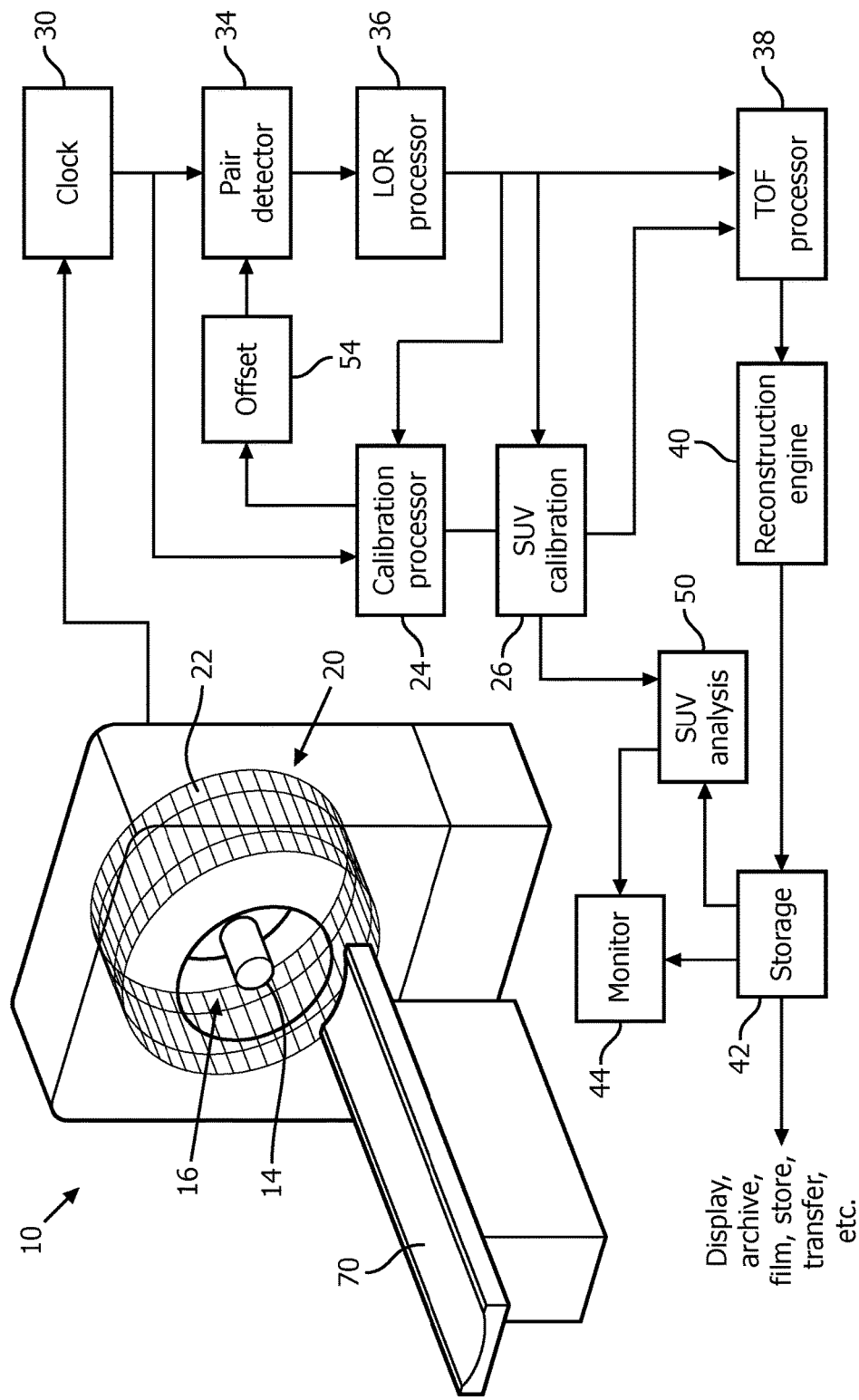
FIG. 2 illustrates a nuclear imaging system to be calibrated.

With reference to FIG. 2, a positron emission tomography (PET) imaging system 10 is to be calibrated for quantitative analysis, such as SUV. The calibration technique uses a conventional calibration source 14 placed within an imaging region 16 (or bore) of a PET scanner 10. The illustrative PET scanner 10 further includes a patient bed or support 18 via which a patient is loaded into the examination region 16 (not used during the calibration procedure), and one or more PET detector rings 20. The calibration source 14 is as described previously with reference to the left diagram of FIG. 1, i.e. a cylinder source containing F18 at a high activity level located at the gantry ISO center (that is, equidistant from all detectors of a PET detector ring), and parallel to the patient bed 18 (i.e. cylinder axis oriented along the axial direction). Radiation events are detected by the PET detector rings 20 via scintillator and silicon photomultipliers (SiPMs) or other detectors such as photomultiplier tubes (PMT's), or avalanche photodiodes (APDs) or the like making up detector arrays of the PET rings 20. A calibration processor 24 performs the SUV calibration including per-pixel dead time correction to generate an SUV calibration including dead time 26.

The calibration including dead time correction disclosed herein advantageously leverages coincidence-based data processing machinery that is used during patient (or, more generally, subject) imaging. Accordingly, subject imaging is first described.

During imaging, each detected gamma photon event is time stamped by a clock 30. In a digital PET system each event is typically time stamped on circuitry that supports the SiPM. A coincident pair detector 34 compares the timestamps of the detected events to determine pairs of events which define the end points and/or, e.g. occur within a preselected coincidences time window.

The ring of radiation detectors 20 (including crystals, (e.g., thousands) light detectors (e.g., hundreds, thousands), and support circuitry modules (e.g., tens)) are arranged around the imaging region 16 to detect radiation events (e.g., gamma rays) emitted from within the imaging region 16. As depicted, the plurality of detectors 20 can be arranged in a plurality of modules 22, each of which sends digital signals indicative of at least energy and the time of each event. The scanner 10 further includes the support mechanism 18 for positioning a patient or an imaging subject in the imaging region 16. In some instances, the support mechanism 18 is linearly movable in an axial direction generally transverse to the PET ring or rings 20 to position the region of interest of the patient in the field of view, and in some imaging techniques to facilitate acquiring three dimensional imaging data.

In preparation for imaging with the scanner 10, a suitable radiopharmaceutical is administered to the subject that will be scanned, and the subject is positioned within the imaging region 16. The radiopharmaceutical includes radioisotopes that undergo radioactive decay, which results in an emission of positrons. Each positron interacts with a nearby electron and annihilates, which produces two oppositely directed (180 degree) gamma rays having energies of about 511 keV each. The two oppositely directed gamma rays may strike opposing detectors at substantially the same time, i.e., coincidentally.

The pair detector 34 identifies pairs of substantially simultaneous or coincident gamma ray detections belonging to corresponding electron-positron annihilation events. This processing can include, for example, energy windowing (e.g., discarding radiation detection events outside of a selected energy window disposed about 511 keV) and coincidence-detecting circuitry (e.g., discarding radiation detection event pairs temporally separated from each other by greater than a selected time-window).

Upon identifying an event pair, a line of response (LOR) processor 36 processes the pair of events to identify a spatial LOR connecting the two gamma ray detections. Since the two gamma rays emitted by a positron-electron annihilation event are oppositely spatially directed, the electron-positron annihilation event is known to have occurred somewhere on the LOR. In TOF-PET, the detectors and the time stamping of the clock 30 have sufficiently high temporal resolution to detect a time-of-flight (TOF) difference between the two substantially simultaneous gamma ray detections. In such TOF PET imaging systems, a TOF processor 38 analyzes the time difference between the times of each event of the coincident pair to localize the positron-electron annihilation event along the LOR.

A reconstruction engine 40 reconstructs an imaging data set comprising LOR (optionally with TOF localization) into images that are stored in storage or memory 42, and can be displayed, printed, archived, filmed, processed, transferred to another device, displayed on a monitor 44, etc. A radiologist or other suitable clinician can use the raw data and/or reconstructed image to control the TOF-PET scanner 10, diagnose the subject, etc.

To perform quantitative analysis, such as illustrative Standardized Uptake Value (SUV) analysis, an SUV analysis module 50 applies the SUV calibration 26 generated by the calibration processor 24 to convert image intensity values to normalized tissue radioactivity concentration values so as to generate SUV data. If SUV is computed on a per-pixel basis, then an SUV image results, which can be displayed on the monitor 44. Alternatively, SUV can be computed for a region of interest (ROI) and presented as a numerical value for the ROI, again suitably displayed on the monitor 44. As disclosed herein, the SUV calibration 26 included dead time correction on a per-pixel basis. As used herein, the term "detector pixel" denotes a detector image element of the PET ring 20 that is capable of detecting a single event.

It is to be appreciated that the processing described above as well as other processing can be performed by one or more processing components. Thus, the processing described herein can be processed by a single processing component, individual processing components, different combinations of processing components, and/or a combination thereof.

Having described subject imaging, the processing performed by the calibration processor 24 to generate the SUV calibration 26 is described. This calibration processing leverages the coincidence-based data processing machinery 34, 36 used during imaging. In particular, the singles rate is estimated for each pixel based on a randoms rate measured using the pair detector 34 with an applied time offset 54 as described herein. The singles rate for each pixel is then used to estimate the dead time for that pixel.

To perform the calibration, the cylindrical phantom 14 is placed in the scanner 10 at the isocenter with its cylinder axis oriented horizontally, i.e. along the axial direction and transverse to the plane of the PET ring 20. The cylinder source contains a radiopharmaceutical, e.g. F18, at a high radioactivity level that is assessed as it decays for true coincidences, random events, and singles rate. A single is any 511 keV event that is detected by a detector 20, including true coincident events and random events and scatter events. A true coincidence event consists of two 511 keV particles detected within the coincidence time window, from which it may be inferred that both 511 keV particles were produced by a single electron-proton annihilation event. A random event consists of two 511 keV particles (or particles falling within the energy window for 511 keV) that are detected within the coincidence time window, but which do not in fact originate from a single electron-proton annihilation event.

A random occurring within the coincidence time window cannot be distinguished from a true coincidence event. However, it is recognized herein that the random rate can be measured using the following rationale. Since the two events making up the random are statistically independent (e.g. not sourced from a common electron-proton annihilation event), it follows that the rate of occurrence of such event pairs should be independent of the time interval separating them. To quantify, denote the coincidence window as $\Delta t$, and two singles $s_1$, $s_2$ occurring at times $t_1$, $t_2$ respectively. Further define an offset time T. Then a randoms rate is defined as the rate of single pairs $s_1$, $s_2$ for which $t_2-T$ lies within the coincidence window $\Delta t$ of the time $t_1$. In this estimate, the offset T is selected to be large enough to exclude true coincidence events—in other words, there should be no overlap between the coincidence window $\Delta t$ and the offset window $T+\Delta t$. Because randoms are statistically independent, the offset rate (that is, the rate of events $s_1$, $s_2$ occurring at respective times $t_1$, $t_2$ where $t_2-T$ lies within the coincidence window $\Delta t$ of the time $t_1$) should equal the randoms rate.

In view of the foregoing, the randoms rate can then be measured by imposing a time offset 54 (previously denoted as offset T) on the pair detector 34, so that the coincidence detection machinery 34 is leveraged to measure the randoms rate.

To perform the calibration, a listmode acquisition of the phantom 14 is performed by the PET scanner 10 to acquire listmode data for calibrating the PET scanner 10, in particular the detectors 20. The calibration source 14 is located at the gantry ISO centre, parallel to patient bed to factor out detector variations. The listmode acquisition is performed periodically, until the calibration source is decayed to a level such that the apparent dead time is zero.

The detectors 20 are typically paralyzable detectors where a single event occurring at the detector during dead time restarts the dead time period. The apparent dead time is directly correlated to the singles rate of the detector 20, i.e. the pixel or crystal. However, the main output of a PET system is true coincidence events. Typically, the singles rates for each detector 20, i.e. pixel or crystal, are not available and not easily obtained in the hardware data chain. For example, the singles rate may be measured at the module level as a type of "dark current" metric for measuring performance of the detector module 22. In practice, however, both singles and random events have a local spatial variance across the pixel pairs. The rate of random events is proportional to the square of the singles rate, i.e., the singles rate of each detection element, and in turn correlated to the detector dead time. As disclosed herein, using random events, which are readily available for each LOR, the singles rate can be estimated with a proper signal decomposition method. The random events rates are estimated as already described, using the delay technique which adds the time delay offset 54 to one of the coincidence paths, e.g., T=100 ns, such that "coincidence" events with this offset 54 are classified as random events and not true coincidence events, and the randoms rate is measured on a per-detector pixel pair basis using the same machinery that measures the coincidence rate.

Figure 3:
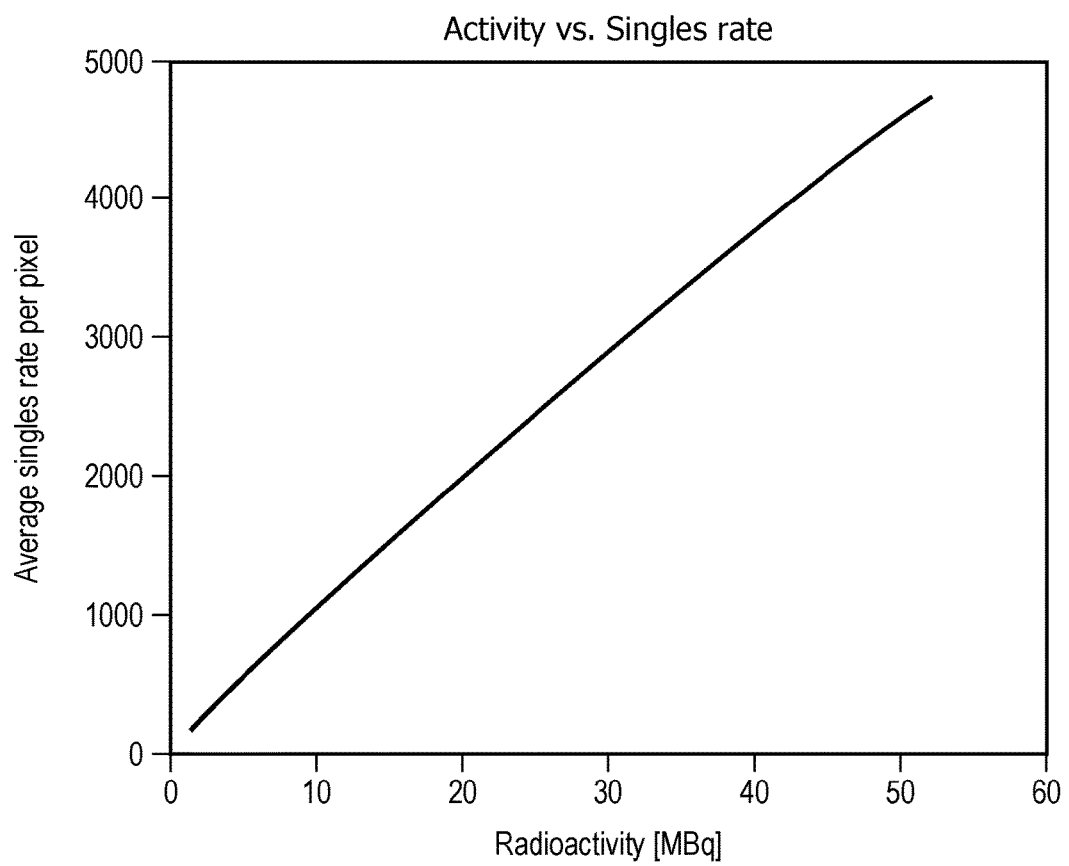
FIG. 3 depicts a plot of average singles rate vs. radioactivity.

With continuing reference to FIG. 2 and with further reference to FIG. 3, the calibration processor 24 determines the relationship of a singles rate to radioactivity of the radiopharmaceutical through direct measurement of the singles rate during the SUV calibration. With reference to FIG. 3, the calibration processor 24 averages the acquired single rate during SUV calibration for the entire system and assigns the average value to each detector 20 which is plotted against the detector exposure, i.e. the radioactivity of the phantom. The pixels of the detector 20 are arranged in the gantry in a tangential direction x, about Nx=576 detector elements, and an axial direction y, about Ny=40 detector elements, resulting in 23,040, i.e. 576*40 or Ny*Ny, pixels in the system. With continuing reference to FIG. 3, the plot is nearly linear, however, the slope decreases as the average singles rate increases, indicating a paralyzed state for the detector 20. Again, this sub-linear slope is due to some singles events failing to be detected because they occur during the detector pixel dead time while it is resetting from detecting a previous singles event. The sub-linear relationship captured in the SUV calibration of FIG. 3 conventionally provides the dead time correction—but it is a system-level correction, and cannot account for different dead times for different detector pixels.

Figure 4:
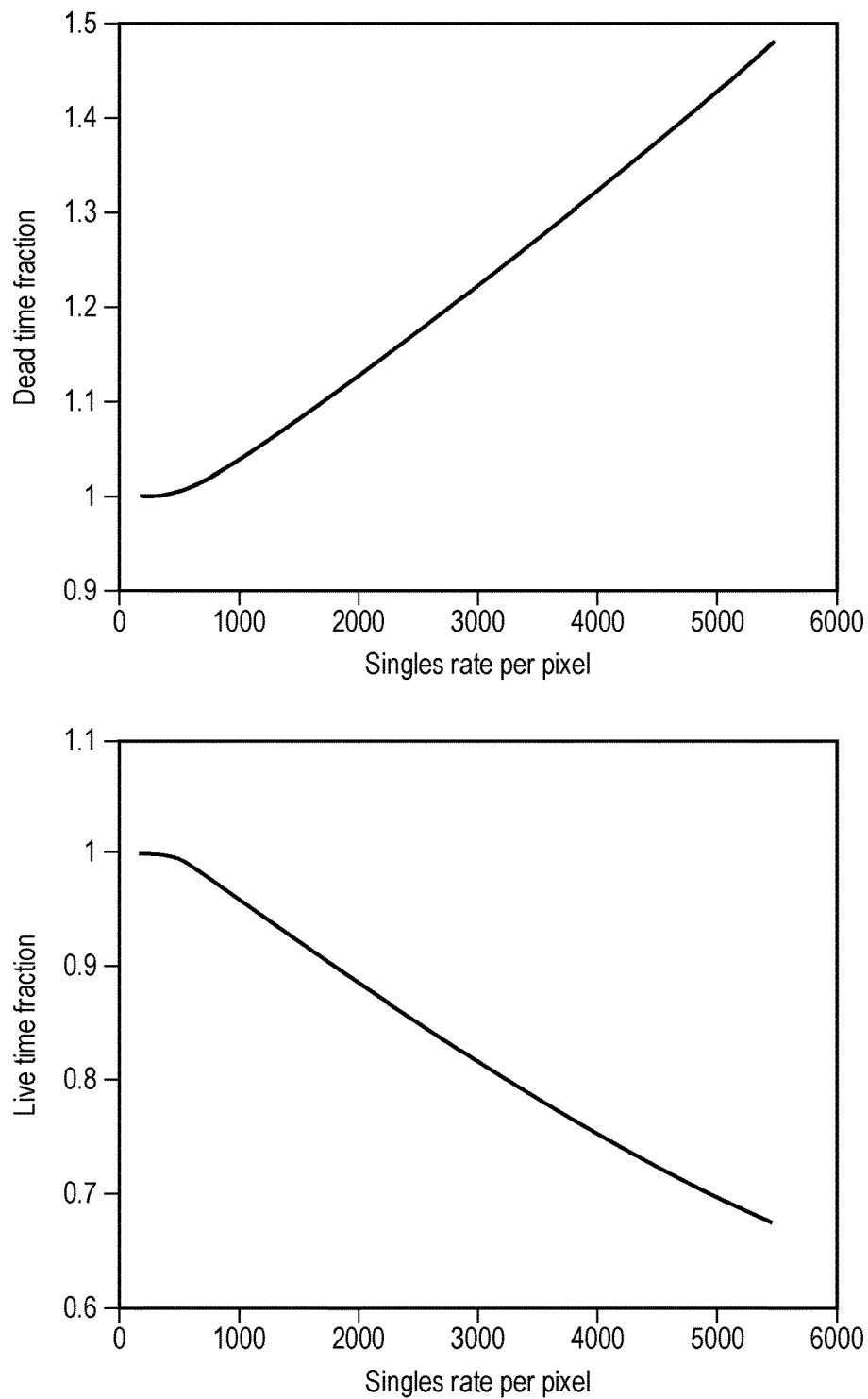
FIG. 4 depicts dead time correction factor vs. singles rate per pixel plot and a live time factor vs. singles rate per pixel plot.

The relationship of singles rate to a measured dead time is a determined dead time correction factor measured during SUV calibration, e.g. by extracting the dead time as a metric of the sub-linearity of the data of FIG. 3. With reference to FIG. 4, the dead time correction factor is plotted against the average singles rate per pixel (left side of the figure). The dead time correction factor is suitably implemented as a multiplier for the coincidence window to compensate for dead time due to random events paralyzing the detector 20. Additionally or alternatively, the calibration processor 24 calculates a live time factor from the dead time factor, or directly from the data of FIG. 3. The live time factor is a reciprocal to the dead time correction factor—whereas the dead time measures the fraction of time the detector pixel is inactive due to paralysis, the live time measures the fraction of time the detector is active, i.e. in a non-paralyzed state. Said another way, the live time is an alternative (i.e. reciprocal) representation of the dead time, and when used in its broadest sense herein the term "dead time" encompasses its representation as a reciprocal, or live time, value. As seen in FIG. 4, live time has a practical advantage over dead time in that the live time is a true probability-type value that ranges between zero and one. Live time can be viewed as the detector's 20 probability of data loss in processing additional data. The live time factor is calculated as a function of detector's 20 singles rate per pixel (right side of the figure). The left hand side of FIG. 4 is the dead time correction factor vs. singles rate, and the right hand side of FIG. 4 is the live time factor vs. singles rate. Both plots describe the same correction but in a reciprocal manner. At a lower singles rate, the live time factor is 1, indicating the detector is able to capture all photons, i.e. non-paralyzed. As the singles rate increases, the live time factor decreases. This means more single events, or counts, are not detected.

The processing of FIGS. 3-4 is typically performed on a module level or system level, as the PET coincidence detector machinery 34, 36 is not utilized. This means that conventionally the SUV calibration cannot provide a per-detector pixel dead time.

Figure 5:
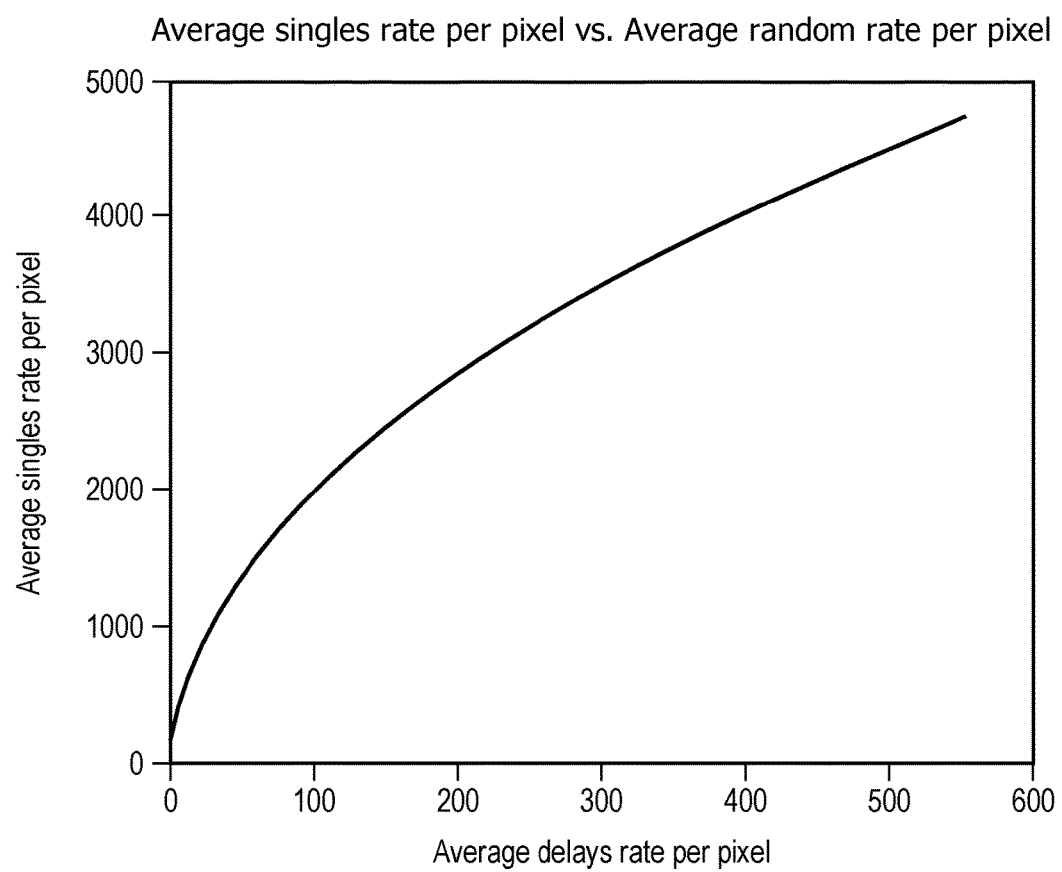
FIG. 5 depicts an average singles rate per pixel vs. average random rate per pixel plot.

With reference to FIG. 5, the random rate, i.e. delay rate, which is measured as the rate of "coincidence" events with the time offset 54 for one pixel, is typically a square function of the singles rate, i.e. for a detector pixel pair i,j where detector pixel i has a (ground truth) singles rate $S_i$ and detector pixel j has a (ground truth) singles rate $S_j$, the randoms rate $R_{ij}$ for the pixel pair i,j is $R_{ij} \propto S_i \times S_j$ (where the symbol "$\propto$" is used in its conventional sense to denote a proportional relationship). In one embodiment, the singles rate for each detection element is used, computed using the relation $R_{ij}=2\tau S_i S_j$ where $\tau$ is the coincidence window width and $R_{ij}$ is acquired for each pixel pair i,j using the coincidence machinery 34, 36 with the offset 54 applied. In another embodiment, for SUV calibration, the singles rate for all detection elements is consistent after accounting for normalization differences (due to the radial symmetry of the cylinder calibration source 14, and neglecting any pixel-to-pixel variations), and so the system singles rate averaged over the number of pixels can be taken as the per-detector pixel singles rate.

In the following, the singles rate per-detector pixel computed from the randoms rates $R_{ij}$ is described in further detail. The measured random rate $R_{ij}$, also referred to herein as the delay rate, between a detector pair i and j is related to the corresponding singles rate of each detector i and detector j according to:

$$R_{ij}=2\tau S_i * S_j \quad (1)$$

where $R_{ij}$ is the measured randoms rate of the line of response from i to j; $\tau$ is the coincidence window width; and $S_i$ and $S_j$ are the singles rate at the respective detector pixels i and j. This equation can be solved for each pixel pair i,j in the gantry for which a line of response can be defined (in a suitable approach, a LOR is defined for each pixel pair i,j for which the line connecting pixels i and j passes through the imaging region 16). Considering all such pixel pairs i,j, Equation 1 forms a system of nonlinear equations with one equation for each detector pair i,j, where $R_{ij}$ are known random rate measurements from the SUV calibration and $S_i$ and $S_j$ are unknowns. The system of equations is heavily overdetermined since each pixel i can pair with a large number of other pixels j, and vice versa. In one embodiment, the calibration processor 24 resolves the nonlinear system of equations using a global optimization method such as least squares minimization method or the like.

Figure 6:
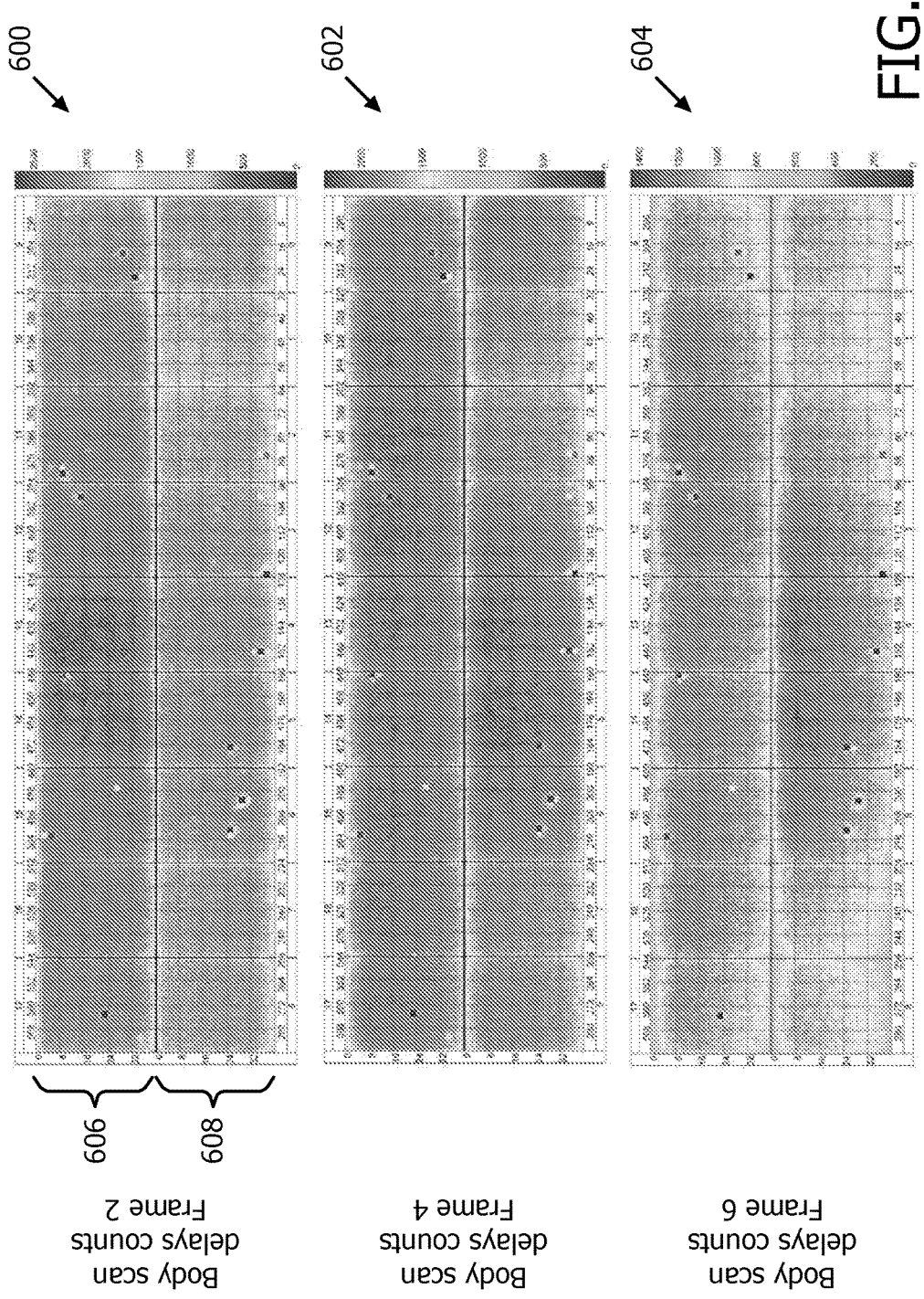
FIG. 6 depicts two-dimensional histograms of singles rates for different frames of the calibration source

In another embodiment, with reference to FIG. 6, the calibration processor solves the nonlinear system of equations by generating a 2D histogram 600, 602, 604 of the random events. The histogram 600, 602, 604 is a map of the singles rate with a scaling factor. The scaling factor is obtained as $$\alpha = \frac{s}{\sum s_{xy}} \quad (2)$$

Where S is the system singles rate (e.g. as provided in the calibration data of FIG. 3); $s_{xy}$ is the singles rate derived from random events for a detector pixel in 2D space, where x=0, 1, ... Nx, and y=0, 1, ... Ny. The summation of all individual singles rates should be the same as the system singles rate S. The histogram 600, 602, 604 divided into a top half 606 and bottom half 608 of the ring of detectors 20 in the gantry. In this particular embodiment there are 6 total frames representing a part of the bed position of the entire scan of the body, where, in continuing reference to FIG. 6, histograms of frame 2 600, frame 4 602, and frame 6 604, are shown. The intensity of each pixel corresponds to the singles rate derived from random events. In one embodiment, the singles rate is represented as colors in the histogram. In another embodiment, the singles rate is visually represented according to grey scale intensity. From the histograms 600, 602, 604, pixels with high singles rates varies from pixels with low singles rates by as much as 30%. In another embodiment, the 2D histogram can be represented in a lookup table.

To obtain dead time per pixel, the calibration processor 24 calculates the live time (LT) of two pixels i and j at the ends of each LOR. The calibration processor 24 calculates the live time as a combination of the singles rates of each detector using $$LT_{ij}=f(S_i)*f(S_j) \quad (3)$$

where f is the live time factor for the singles rate per pixel and $LT_{ij}$ is the live time factor for the LOR between i and j. For example, $f(S_i)$ is the live time factor corresponding to the singles rate $S_i$ read from the plot of FIG. 4. The dead time correction factor is calculated as the inverse of the live time factor for the LOR depicted as $$DT_{ij}=\frac{1}{LT_{ij}} \quad (4)$$

where $DT_{ij}$ is the dead time correction factor for each LOR from i to j. In one illustrative approach for implementing the correction, the determined dead time correction factor $DT_{ij}$ is used as a multiplier to the coincident window $\Delta t$ to correct the true coincidences rate for the dead time. The calibration processor 24 stores the dead time correction factor $DT_{ij}$ in the correction memory 26 as part of the SUV calibration for use by the system when performing SUV or other quantitative analysis of a patient image.

Figure 7:
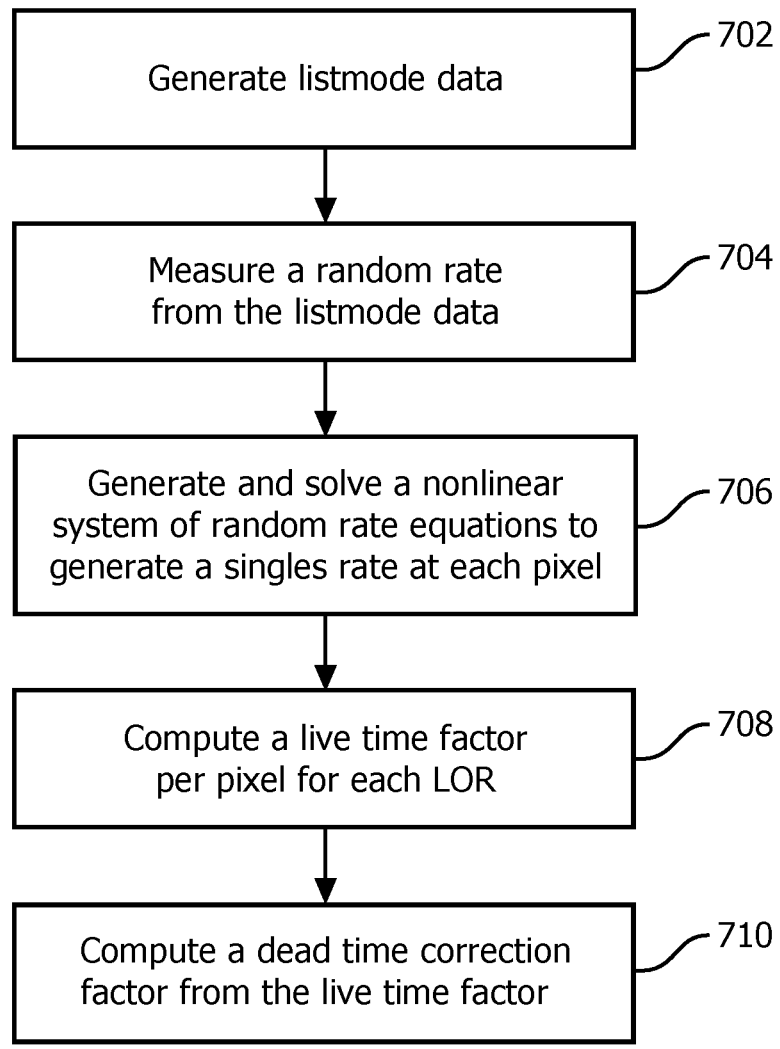
FIG. 7 depicts a method for calibrating a diagnostic imaging system.

With reference to FIG. 7, to summarize, a method for computing deadtime time correction factor per pixel is depicted. At a step 702, listmode data are acquired of the calibration phantom 14. At a step 704, a random rate is determined from the listmode data for each LOR by applying the pair detector 34 to the listmode data with the offset 54. At a step 706, a nonlinear system of random rate equations is generated in accord with Equation 1 and solved to generate a singles rate at each detector pixel. The nonlinear system is suitably solved using a 2D histogram or the like as described with reference to FIG. 6, or by a least squares optimization method, or so forth. At a step 708, a live time factor is computed for each LOR of a coincident pair using Equation 3. At a step 710, a dead time correction factor is computed as the reciprocal the live time for each LOR as per Equation 4.

The SUV calibration of FIG. 3 can be adjusted to remove the sub-linearity introduced by the dead time, since the dead time is now corrected separately, e.g. by scaling the coincidence window as $DT_{ij}\Delta t$. One way to do this is to fit the lower portion of the singles rate-vs.-radioactivity curve to a straight line, since dead time is negligible in this region of the SUV calibration. This linearized SUV calibration curve is suitably stored as part of the SUV calibration 26 (along with the data of FIG. 4 or a parametric equation derived therefrom, e.g. function $f$, and optionally FIG. 5, or the scaling factor i extracted from this curve).

The SUV analysis module 50 can apply the SUV calibration 26 as follows. Given a listmode imaging dataset for a subject, the randoms $R_{ij}$ for each LOR i,j is obtained by applying the pair detector 34 to the list mode data with the offset 54. Equation 1 is applied to generate a system of equations that are solved to determine the singles rates $S_i$ and $S_j$ for respective detector pixels i,j. Equation 3 is then applied (leveraging the calibration data of FIG. 4 stored as part of the SUV calibration 26 as the function $f$) to generate the live time $LT_{ij}$ for the LOR i,j. The dead time $DT_{ij}$ is then the reciprocal of this as per Equation 4. Thereafter, the list mode imaging data set is processed in the usual way, e.g. applying the coincidence machinery 34, 36 without the offset 54, but with the coincidence window adjusted for each pixel pair i,j according to $DT_{ij}\Delta t$, in order to generate LOR data that is reconstructed by the reconstruction engine 40 to generate an image with dead time correction. This image may be useful by itself, insofar as the image is made more accurate by eliminating the distorting effect of dead time. If quantitative analysis is desired, the image is processed by the linearized version of the SUV calibration curve (i.e. linearized version of FIG. 3, again stored as part of the SUV calibration 26) to convert intensity values to (normalized) activity or uptake levels.

As used herein, a memory includes any device or system storing data, such as a random access memory (RAM) or a read-only memory (ROM). An electronic data processing device including a processor with suitable firmware or software implements the various processing components 24, 34, 36, 38, 40, 50. Such an electronic data processing device may comprise any device or system processing input data to produce output data, such as a microprocessor, a microcontroller, a graphic processing unit (GPU), an application-specific integrated circuit (ASIC), a FPGA, and the like; a controller includes any device or system controlling another device or system, and typically includes at least one processor; a user input device includes any device, such as a mouse or keyboard, allowing a technician of the user input device to provide input to another device or system; and a display device includes any device for displaying data, such as a liquid crystal display (LCD) or a light emitting diode (LED) display.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. A positron emission tomography (PET) system comprising:
    a plurality of radiation detectors configured to detect coincident radiation event pairs defining lines of response (LORs) emanating from an imaging region and detected by detector pixels of the radiation detectors; and
    at least one processor configured to:
        cause the radiation detectors to acquire listmode data comprising singles events detected by the detector pixels; and
        compute a dead time correction factor for each LOR defined by a pair of detector pixels wherein the dead time correction factor for each LOR is computed by determining a random rate for each LOR from the listmode data and determining a singles rate for each detector pixel from the determined random rates and computing a live time $LT_{ij}$ factor for the LOR defined by detector pixels i and j based on the singles rates $S_i$ and $S_j$ for the detector pixels i and j respectively.

2. The system according to claim 1, wherein the operation of determining a singles rate for each detector pixel comprises solving a system of equations $R_{ij} \propto S_i{}^*S_j$, where $R_{ij}$ is the determined random rate of the LOR defined by detector pixels i and j; the symbol "$\propto$" denotes a proportional relationship; and $S_i$ and $S_j$ are unknown singles rates for detector pixels i and j respectively.

3. The system according to claim 2, wherein solving the system of equations $R_{ij} \propto S_i{}^*S_j$ includes the at least one processor further configured to:
    generate a histogram map of the singles rate per pixel, wherein the histogram includes a scaling factor.

4. The system according to claim 1, wherein the computing the dead time correction factor includes the at least one processor further configured to:
    compute the dead time correction factor from the live time factor using $$DT_{ij} = \frac{1}{LT_{ij}}$$

where $DT_{ij}$ is the dead time correction factor for each LOR from i to j.

5. A method for computing dead time correction factor per detector pixel in a positron emission tomography (PET) scanner, the method comprising:
    using PET radiation detectors, detecting a plurality of 511 keV radiation events emanating from an imaging region; and
    using an electronic data processing device, computing a dead time correction factor for each line of response (LOR) defined by a pair of detector pixels of the PET radiation detectors wherein computing the dead time correction factor includes:
    determining a measured random rate for each LOR from the detected plurality of 511 keV radiation events using a delay technique which measures coincidences with an added time delay offset; and
    determining a singles rate for each detector pixel of the PET radiation detectors from the determined random rates by solving a system of equations $R_{ij}=2\tau S_i{*}S_j$ comprising one equation of the system of equations for each detector pair i and j for which a LOR is defined, where $R_{ij}$ is the determined random rate of the LOR defined by detector pixels i and j and τ is a coincidence window width and $S_i$ and $S_j$ are unknown singles rates for detector pixels i and j respectively.

6. The method according to claim 5, wherein solving the system of equations $R_{ij}=2\tau S_i{*}S_j$ includes the at least one processor further configured to:
generating a histogram map of the singles rate per pixel, wherein the histogram includes a scaling factor.

7. The method according to claim 5, wherein computing the dead time correction factor includes:
compute a live time factor $LT_{ij}$ for the LOR defined by detector pixels i and j based on the singles rates $S_i$ and $S_j$ for the detector pixels i and j respectively according to $LT_{ij}=f(S_i){*}f(S_j)$ where $f(S_i)$ and $f(S_j)$ are live time factors corresponding to singles rates $S_i$ and $S_j$ respectively.

8. The method according to 7, wherein computing the dead time correction factor includes:
compute the dead time correction factor from the live time factor $LT_{ij}$ using $$DT_{ij} = \frac{1}{LT_{ij}}$$

where $DT_{ij}$ is the dead time correction factor for each LOR between i and j.

9. The method according to claim 5 wherein the detecting comprises acquiring PET imaging data for an imaging subject, and the method further comprises:
using the electronic data processing device, reconstructing the PET imaging data to generate a PET image of the imaging subject and transforming the PET image to generate Standardized Uptake Value (SUV) data for the imaging subject comprising a parametric SUV image or an SUV value for a region of interest;
wherein the reconstructing and transforming includes correcting the PET imaging data for detector dead time using the dead time correction factors for the LORs.

10. A non-transitory computer readable medium carrying software for controlling one or more processors to perform the method of claim 5.

11. A positron emission tomography (PET) imaging system comprising:
PET radiation detectors disposed around an imaging region configured to detect radiation events emanating from the imaging region; and
a calibration phantom configured to be disposed in the imaging region, the phantom comprising a positron-emitting radioisotope; and
one or more processors configured to:
acquire listmode data of the phantom using the PET radiation detectors as radioactivity of the phantom decays over time;
determine a radioactivity level versus singles rate curve based on the acquired listmode data and a known radioactivity decay rate of the phantom over the acquisition of the listmode data;
determine from the listmode data a random event rate for each line of response (LOR) connecting two detector pixels of the PET radiation detectors;
determine a singles rate for each detector pixel based on the random event rates for the LORs;
compute a live time factor of each LOR between detector pixel i and detector pixel j based on the singles rates for the detector pixels i and j;
compute a dead time correction factor for each LOR as the reciprocal of the live time factor computed for the LOR; and
adjust a coincidence window width of a coincident 511 keV event pair detector of the PET imaging system for each LOR using the dead time correction factor computed for the LOR wherein the coincidence window width is adjusted for each LOR defined by pixel pair i,j according to $DT_{ij}\Delta t$, where $\Delta t$ is the coincidence window width and $DT_{ij}$ is the dead time correction factor for the LOR.

12. The system according to claim 11, wherein the operation of determining a singles rate for each detector pixel comprises solving a system of equations $R_{ij}=2\tau S_i{*}S_j$, where $R_{ij}$ is the determined random rate of the LOR defined by detector pixels i and j; τ is the coincidence window width of the coincident 511 keV events detector of the PET imaging system; and $S_i$ and $S_j$ are unknown singles rates for detector pixels i and j respectively.

13. The system according to claim 12, wherein solving the system of equations $R_{ij}=2\tau S_i{*}S_j$ includes the at least one processor further configured to:
perform a least squares optimization of the singles rate per detector pixel.

14. The system according to claim 11, wherein the operation of determining from the listmode data a random event rate for each LOR uses a coincident 511 keV events detector of the PET imaging system with a predetermined time offset large enough to avoid detecting true coincident 511 keV event pairs produced by electron-positron annihilation events.

* * * * *